(12) United States Patent
Telford et al.

(10) Patent No.: US 6,883,465 B2
(45) Date of Patent: Apr. 26, 2005

(54) CAT TOY WITH MUSIC STRING COMPONENT

(76) Inventors: Steve Telford, 4910 Gage St., Boise, ID (US) 83706; John Telford, 4910 Gage St., Boise, ID (US) 83706

( * ) Notice: Subject to any disclaimer, the term of this patent is extended or adjusted under 35 U.S.C. 154(b) by 0 days.

(21) Appl. No.: 10/449,160

(22) Filed: May 29, 2003

(65) Prior Publication Data

US 2004/0237903 A1    Dec. 2, 2004

(51) Int. Cl.[7] ............................................. A01K 29/00
(52) U.S. Cl. ........................ 119/708; 119/707; 446/490
(58) Field of Search ........................ 119/702, 707, 708, 119/711, 719; 446/227, 490

(56) References Cited

U.S. PATENT DOCUMENTS

| | | | |
|---|---|---|---|
| 1,446,835 A * | 2/1923 | Cook | 446/227 |
| 2,032,871 A * | 3/1936 | Dammeyer | 446/490 |
| 4,170,085 A * | 10/1979 | Luke | 446/319 |
| 4,712,510 A | 12/1987 | Tae-Ho | 119/708 |
| D298,871 S | 12/1988 | Killen | D30/160 |
| 4,930,448 A | 6/1990 | Robinson | 119/708 |
| 4,940,018 A | 7/1990 | Edling | 119/708 |
| D309,964 S | 8/1990 | Viner et al. | D30/160 |
| D318,150 S | 7/1991 | Eitel et al. | D30/160 |
| 5,148,769 A * | 9/1992 | Zelinger | 119/708 |
| 5,755,184 A | 5/1998 | Neidenberger | 119/707 |
| 5,810,022 A * | 9/1998 | Reynolds | 132/200 |
| 5,815,873 A * | 10/1998 | Jones | 15/106 |
| 5,924,387 A | 7/1999 | Schramer | 119/708 |
| D452,050 S | 12/2001 | Ritchey | D30/160 |
| 6,481,381 B1 | 11/2002 | Ritchey | 119/708 |

FOREIGN PATENT DOCUMENTS

GB          2274402       *   7/1994

* cited by examiner

Primary Examiner—Robert P. Swiatek
(74) Attorney, Agent, or Firm—Pedersen & Co., PLLC; Ken J. Pedersen; Barbara S. Pedersen

(57) ABSTRACT

A stringed cat toy to encourage playful activity and exercise in cats and healthy interaction between cat owners and their pets. The cat toy comprises an elongated music string with a small handle securely connected at one end and an object which is attractive to cats secured at the opposite end. The preferred cat toy string is selected from a group of composite strings used for instruments such as the cello, bass or violin, which are of low tensile strength and are designed for low-frequency vibration on the order of about 100 Hertz or less. The dynamic properties of the composite string facilitate interesting movements of the attractor, preferably a horse hair tassel, when the handle is rotated. The motion of the attractor appears to be a life-like and erratic movement that simulates prey and stimulates natural predatory instincts within the cat to encourage the animal to leap at the object. Such playful activity both exercises the cat and promotes beneficial interaction between cat and owner.

18 Claims, 3 Drawing Sheets

CAT TOY WITH MUSIC STRING COMPONENT

BACKGROUND OF THE INVENTION

1. Field of the Invention

This invention relates generally to amusement devices or toys for pets. More specifically, this invention relates to a stringed toy for exercising and entertaining cats wherein simple manipulations of the toy by a cat owner produce interesting, erratic motion that is impossible for cats to resist.

2. Related Art

The initiation of playful activity and exercise in pets is very important to reduce the risk of problems like obesity and heart disease that can develop due to poor diets and lack of exercise. Various apparatus have been developed to address the need for exercise by domestic cats. In addition to stimulating play by cats for exercise and good health, apparatus have been created to promote healthy, affectionate interaction between cats and their owners.

Several toys have been created that allow cats to entertain themselves in the absence of their owners. Many of these devices are designed such that any contact with the attractor or target promotes further movements of the attractor to encourage further play. In U.S. Pat. No. 4,712,510 (Tae-Ho) a stuffed object is suspended from a telescoping wand. Cats may pounce upon or claw at the suspended object for amusement. U.S. Pat. No. 4,930,448 (Robinson), U.S. Pat. No. 4,940,018 (Edling) and U.S. Pat. No. 5,924,387 (Schramer) disclose cat toys wherein attractive objects are suspended from flexible members extending above stable mounting platforms. Contact with the suspended object induces a swinging, rotating or other reactionary motion in the flexible member that causes the object to move in a manner that may be attractive to a cat.

Other toys have been developed that allow cat owners to interact positively with their pets while encouraging exercise and play. In each of these apparatus, an object may be appealing to cats is connected to or suspended from a wand or handle that is manipulated by the cat owner. U.S. Design Pat. Nos. D298,871 (Killen), D309,964 (Viner et al.), D318,150 (Eitel et al.) and D452,050 (Ritchey) each disclose a cat toy of this general design. In U.S. Pat. No. 5,755,184 (Neidenberger), an attractor of brightly colored silicone rubber is attached to the distal end of an elongated solid wire of high tensile strength. A handle at the proximal end of the Neidenberger toy allows an owner to induce swinging motions in the wire which cause the attractor to move about and encourage the cat to attack. U.S. Pat. No. 6,481,381 B2 (Ritchey) teaches a pet-play apparatus providing an attractive toy suspended from a rod by a lash of fake fur. Manipulations of the Ritchey rod by a pet owner produce movement of the lash and toy to stimulate playful activity in cats.

Yet, none of these cat exercisers or toys possesses the specific construction and unique advantages of the present invention. There remains a need for a stringed cat toy wherein simple manipulations of one end of the string by a pet owner produce movement of an attractor at the other end of the string that is particularly interesting and exciting to the cat, perhaps due to the movement appearing to be a natural, life-like movement such as would be exhibited by a bird, rodent, or other small prey. Further, there is a need for a cat toy wherein the attractor is composed of substantially natural materials.

SUMMARY OF THE INVENTION

According to the objects of the invention, the present invention is a stringed cat toy for stimulating playful activity in cats and promoting healthy interaction between cat owners and their pets. The cat toy comprises a music string from, for example, a cello or bass, that holds an attractor object at or near a distal end of the music string. The vibrating/resonating characteristics of the music string result in movements of the music string, and therefore of the attractor object, that are particularly attractive and exciting for a cat.

To encourage a cat to attack the attractor object, the attractor object is positioned such that it is visible to the cat. Preferably, the cat toy includes a small-diameter handle at or near its proximal end that is well-adapted for rotation or "twirling" between the fingers or fingers/thumb of the user, which action is particularly effective in establishing vibration of the music string according to its natural resonance. Due to the unique properties of the music string, this rotation of the handle causes the attractor on the distal end to move about in an erratic or unpredictable fashion that is nearly impossible for cats to resist, perhaps because it simulates natural movement such as from a bird wings or tail, a rodent's tail, or other quick action such as may be exhibited by scurrying, fleeing or fighting prey. Consequently, the cat may be entertained and exercised in a way that is very positive for both the cat and its owner.

Preferably, the cat toy attractor is constructed of natural fibers such as horse hair and is preferably made and attached to the music string without adhesives or other chemicals or solvents. This enhances the natural feel and scent of the attractor and enhances the safety of the attractor.

DETAILED DESCRIPTION OF THE INVENTION

Figure 1:
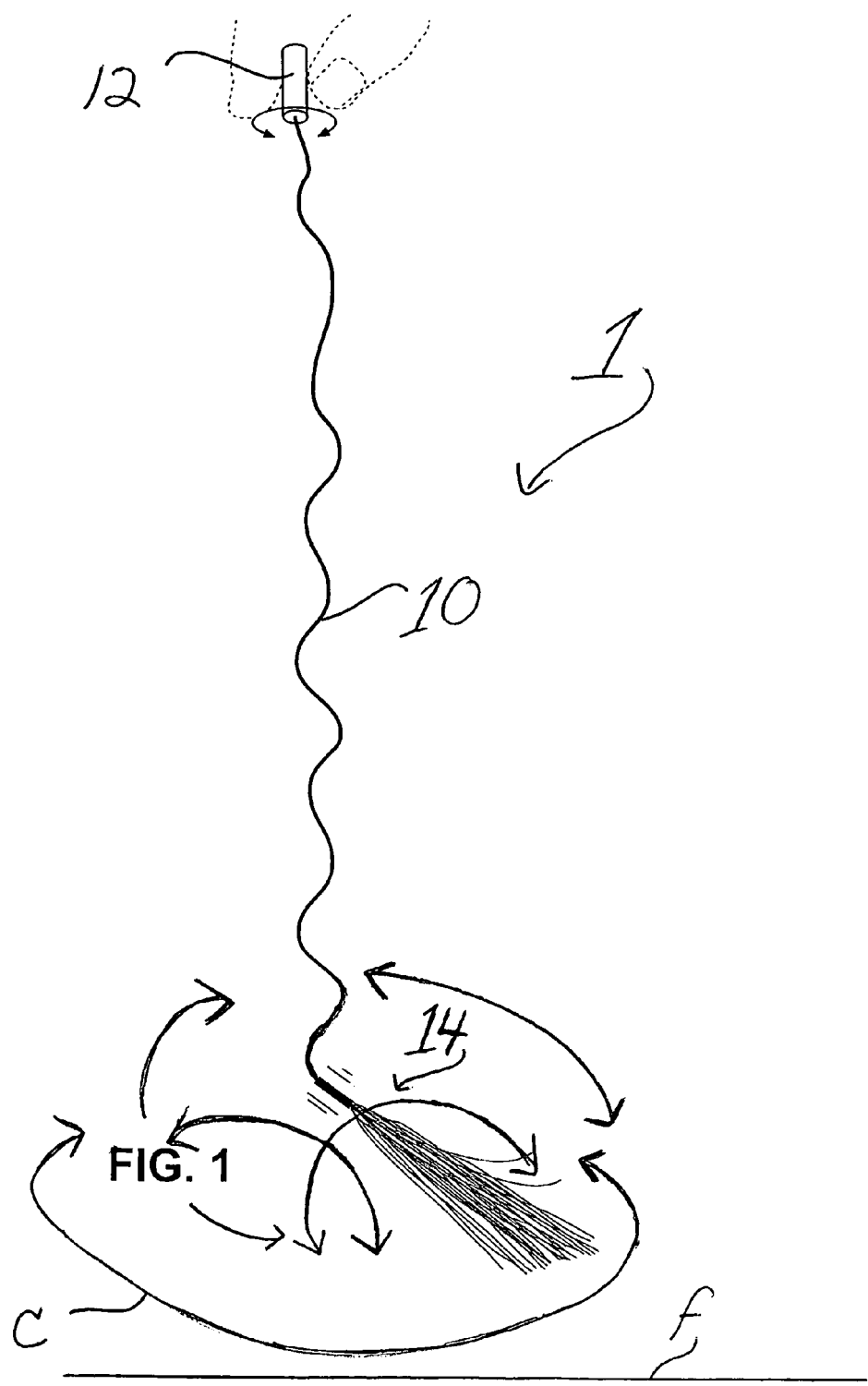
FIG. 1 is an elevation view of the stringed cat toy according to one embodiment of the present invention illustrating the motion of the toy when the toy is dangled generally vertically above the floor and the handle is rotated by a cat owner.

Referring now to the figures, one, but not the only, embodiment of the stringed cat toy 1 is illustrated. The cat toy 1 represents a substantial improvement over previous designs because of its natural motion and natural feel. The preferred toy 1 comprises a composite music string 10 with a small-diameter handle 12 secured at its proximal end and an attractor object 14 secured to its distal end. With very little effort, cat owners can exercise their pets by simply twisting/twirling the handle 12. The harmonic, vibratory properties of the music string 10 translate the rotational motion of the handle 12 into erratic movements of the attractor 14 which are impossible for cats to resist. As illustrated schematically in FIGS. 1 and 2, upon movement of the handle 12, the music string 10 tends to vibrate/resonate in a wave pattern, and the attractor 14 jumps, twirls, and flips either in the air or on the floor or other surface upon which it is placed. While there may be mathematical means for predicting and/or describing the movement of the attractor 14 based on the properties of the music string 10, the motion of the cat toy attractor 14 is unpredictable, erratic, and life-like, at least to the cat.

In FIG. 1, the toy 1 is held a distance above the floor (F), so that the attractor 14 does not touch the floor, but still the harmonic, vibratory motion of the music string 10 in response to the user's rotating of the handle 12 on the handle's longitudinal axis (which is generally coaxial with the axis of the music string) causes erratic motion of the attractor 14, the motion being a combination of swirls and circles in the air generally around the axis of the music string (generally represented as a "circle" C in FIG. 1) plus jumps back and forth to opposite sides of the "circle". This unusual, quick motion is represented schematically in FIG. 1 by the multiple arrows showing several directions of movement.

Figure 2:
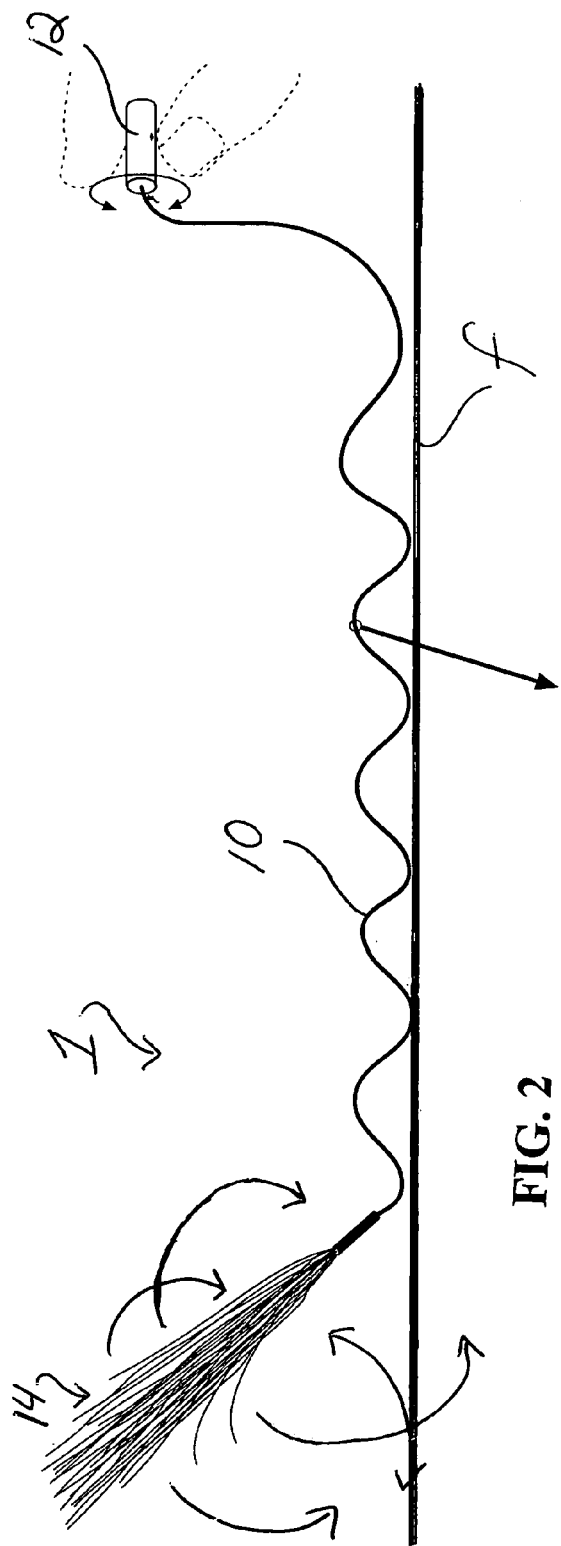
FIG. 2 is a view of the stringed cat toy of FIG. 1 when the toy is placed generally horizontally on the floor and the handle is rotated.

In FIG. 2, the cat toy 1 is shown laid generally on or near the floor, with the music string 10 extending generally horizontally. Twirling of the handle 12 still creates a wave pattern in the music string 10, which translates to flipping, circling, and other movements which are interesting and unpredictable to the cat, as the attractor 14 responds to the music string 10 and to contact with the floor surface and with the cat's paws.

Typically, several of the individual components used to assemble the preferred stringed cat toy 1 are components used in cello, violin, or other stringed instruments played with the use of a bow. The string 10 of the cat toy may be a conventional composite music string such as may be found on a cello, violin, bass or other stringed instrument. Within the desired set of music strings 10, the cello G string is acceptable, a bass E string or bass D is preferred, a bass A string is more preferred and a cello C string is especially preferred. The cello C string commonly available for student cellos, for example, has a particularly desirable vibration combined with a desirable thickness and durability. Currently, a known and preferred provider of the preferred "Red Label" cello C string and other music strings is Super Sensitive String Company of Sarasota, Fla. (USA). A number of other manufacturers exist and may produce acceptable strings. Although the cello C string is not typically available "off-the-shelf" in the desired length, the same technology used to make commercial instrument strings may be employed to make longer cello strings for use in the invented cat toy.

Figure 3:
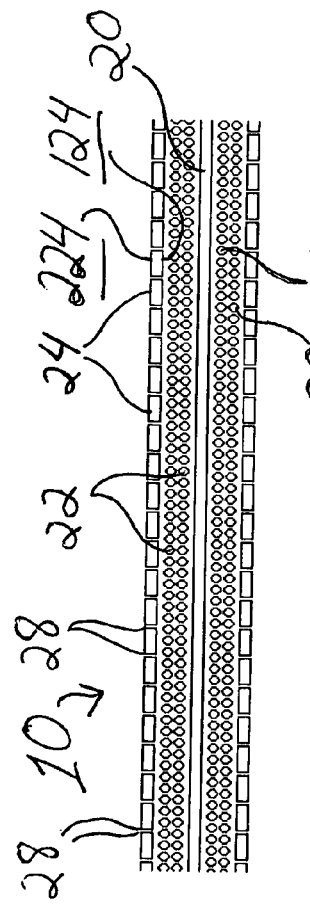
FIG. 3 is a detail longitudinal cross-sectional view of the music string of the cat toy of FIGS. 1 and 2.
Figure 4:
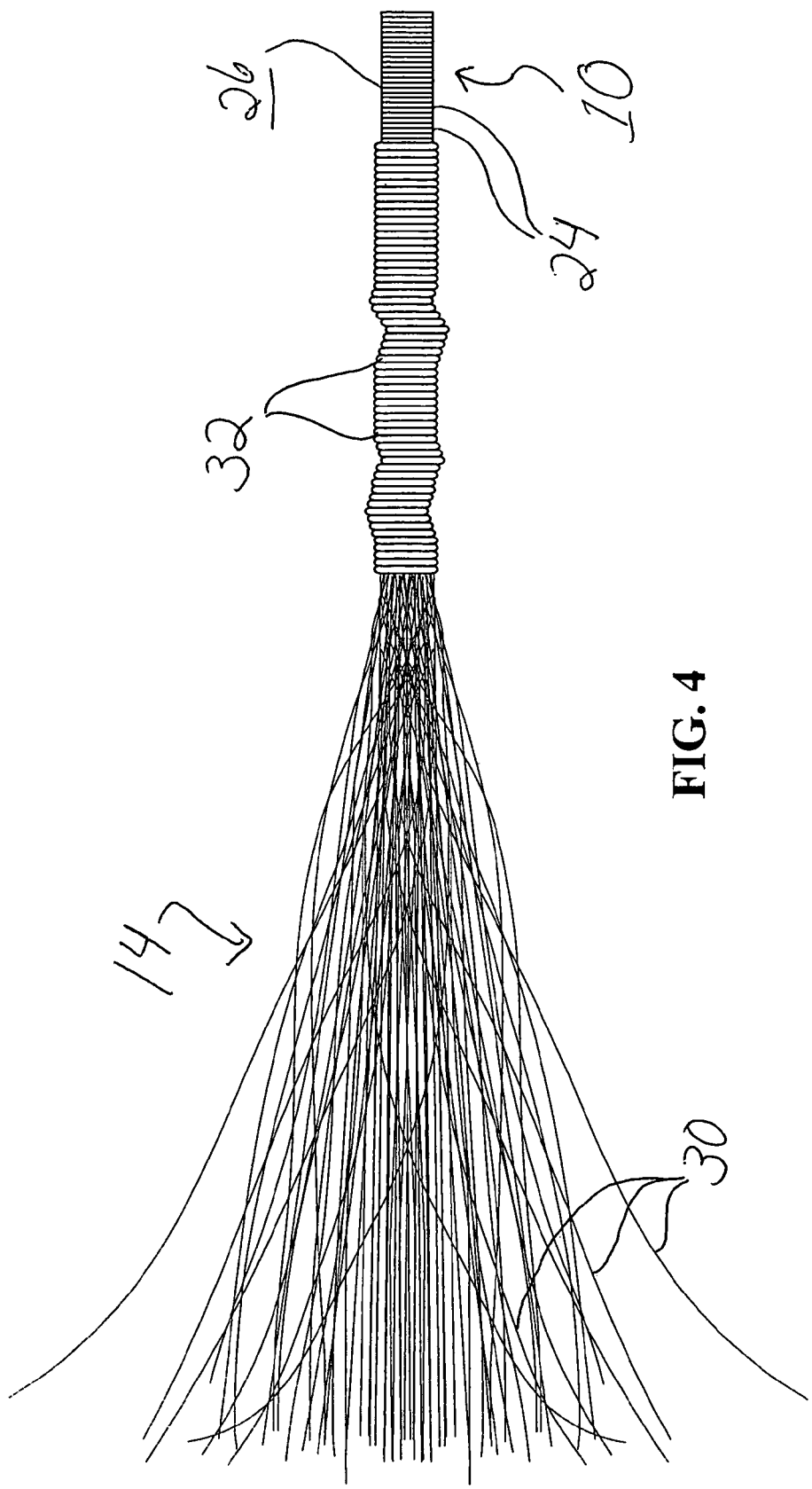
FIG. 4 is a detail view of the attractor of the cat toy of FIGS. 1–3.

The unique construction of the music string 10 gives the string very dynamic properties and also a texture that is attractive to cats. The unique construction preferably includes the string 10 being multi-layered, including an axial core, and one or more layers of generally circumferential windings, some or all or which windings are metal. As shown in FIG. 3, the preferred music string 10 comprises a solid core 20 around which metal strands are tightly wound, preferably in two layers of windings 22, to form a "wound core." Preferably, each of the two metal strands (22, 122) is a continuous strand that is cylindrical in radial cross-section and is copper. This composite, "wound core" is then preferably wrapped with a continuous flat metal "ribbon" 24, preferably made of nickel steel. Thus, the tightly wound flat steel ribbon 24 comprises a sheath for the solid core and secondary copper windings. While the flat steel sheath creates a uniform and substantially smooth exterior surface, a slight ribbed texture exists on the outer surface 26 (see FIG. 4) of the string where the edges 28 of the flat wire wraps meet.

Preferably, the solid core 20 is constructed of steel. However, other alternatives may be foreseen by one skilled in the art, for example, the solid core may be composed of synthetic materials such as nylon or natural materials such as gut, nylon polymers, Perlon™, Synlon™, aramid plastics and other synthetics. In the preferred embodiment, the solid core diameter is on the order of about 0.013 inches. The copper windings 22 of the preferred embodiment each are of a diameter on the order of about 0.012 inches. The flat steel ribbon wrap 24 preferably has a thickness of about 0.003 inches, a width from edge to edge 28 of about 0.020 inches, and a flat inner surface 124 and flat outer surface 224. Thus, the preferred music string 10 illustrated in FIG. 3 has a diameter of greater than 0.06 inches and preferably in the range of about 0.06–0.08 inches. The music string 10 of the preferred cat toy is between about 2 and 5 feet in length. The especially preferred length of the string 10 is between about 2–3 feet.

The string 10 is of low-tensile strength (less than about 60 lbs) and may be of the type used for a cello, bass, instruments in the violin family or viol family, harp or any other stringed instrument using composite strings. Music strings adapted to vibrate at a frequency of about 100 Hertz or less, and most preferably about 50–100 Hertz, are preferred because their natural resonance creates a desirable attractor 14 movement, and, also, these strings are of a desirable thickness that is less fragile and less susceptible to kinks and tangles than higher frequency strings. In addition, the range of motion at the distal end of such strings when the proximal end is rotated is much greater than that for strings vibrating at higher frequencies. This combination of features results in a sturdy toy with a string having a wave-motion that sets up what may be called dramatic, natural and even "wild" movement of the attractor 14, rather than a "quiver" or "wiggle." As described above, the preferred motion is typically a combination of circular motion generally in a circle around the axis of the music wire, jumping out of that circle back and forth to opposite and multiple sides of the circle, and other more erratic and sudden movements that result from the music wire's motion and the forces applied to the attractor 14 by contact with the floor/surface or with the cat. The attractor's motion appeals to the cat's hunting instincts, as the attractor 14 seems to be jumping away from or out from under the cat's paws, as would the cat's prey. As the attractor 14 slides out from the cat's claws and paws and jumps to other unpredictable locations, the cat senses that this is a more natural and interesting action than a swinging wire, a dangling thread, or another predictable toy.

While FIGS. 1 and 2 illustrate a music wire that forms many waves during rotation of the handle, specifically five or more waves, music wire in the 3–4 feet length range selected from the preferred group of strings will tend to exhibit 2–4 waves (having, therefore, 2–4 crests and 2–4 troughs). Of particular note is that the invented cat toy 1 is preferably not made from piano wire or "music wire," which is high tensile strength, solid metal wire. Piano/music wire would not have the resonance and movement characteristics of the preferred composite music wire, and, hence, would not produce the interesting and erratic movement of the invented attractor 14. Instead, piano/music wire would act as a single, curved spring member or whip member that would flex but would not exhibit, in such a cat toy use, the multiple wave crests and troughs that create the present invention's movement.

In the preferred embodiment, the handle 12 has a small diameter so that it may be easily rotated between the thumb and forefinger, as shown in FIGS. 1 and 2. A diameter of between about 1/8" and 3/8" is typically acceptable for most hand sizes. Preferably, the handle diameter is approximately 1/4" as this is particularly comfortable for sustained play. The handle 12 may be constructed of wood, plastic, foam, or any other durable material that may be easily grasped, but the especially-preferred handle is a piece of ebony wood, such as that used for violin tuning pegs. In the preferred embodiment, the length of the handle is less than about 1½", and preferably about 1 inch long, so that it may be held in the fingertips of one hand. However, a longer handle may be produced so that it may be rotated between the palms of both hands to achieve more pronounced rotation. The handle 12 is preferably cylindrical, with a cylindrical bore extending part way into the handle at one end along its axis. The music wire may be inserted and glued into that bore.

The attractor object is attached to the music string 10 at its distal end, opposite the handle 12. In the preferred embodiment, the attractor 14 comprises a lightweight tassel of horse hair. Clean, unbleached white horse hair strands 30 are preferred. Such hair is preferably the same as that used to re-hair the bows of stringed musical instruments. Typically, such hair will be tail hair from China provided in about 30 inch lengths, wherein the hair is cleaned, but not bleached or colored, by natural means which leaves little or no residue or unnatural smell or taste. The hair for the attractor 14 may be cut to a desired length, for example, in the preferred embodiment, the tassel is between about 3 and 8 inches in length. However, a tassel of almost any length is foreseeable so long as the tassel weight does not compromise the essential movement of the toy.

In the preferred embodiment, the tassel is attached to the string 10 by wrapping one end of the hair strands 30 tightly to the string with heavy bow re-hair nylon thread 32 or other thread, preferably without the use of glue or adhesive. For example, wrapping and knotting techniques typically used in re-hairing of bows may be used to attach the horse hair strands 30 to the music string 10 without glue. Natural materials appear to be particularly attractive to cats and reduce the risk of injury to the cat if ingested. However, other alternatives for assembling a safe and effective attractor object may be apparent to one skilled in the art.

To use the toy 1, a pet owner simply positions the toy within the cat's field of vision and rotates the handle 12. As illustrated in FIGS. 1 and 2, the user may dangle the cat toy 1 above the ground or on the ground and rotate the handle 12. As described above, rotation of the handle 12 produces erratic, sweeping movements of the attractor 14 at the distal end of the string 10, which invoke the natural predatory instincts of the cat to encourage the cat to pounce upon the object. Even for a cat having its claws, the horse hair tends to slide out from the claws/paws, probably creating vibrations and other sensations against the paws/claws that are even more exciting and interesting. The action of the paws on the attractor 14 tends to separate the various horse hair strands of the attractor, causing even more interesting motion and interest. This way, the cat is exercised and amused and the relationship between the cat owner and the cat benefits from such playful interaction.

Cats also tend to be interested in, and especially like, the texture of the music string 10. Some cats show great interest in the string itself, perhaps because of the vibration or other sensations given the paws or other skin areas of the cat when the cat rubs or paws against the string 10. Neither the preferred attractor 14 nor the music string 10 have knots, loops, cloth, or other portions in which the claws or teeth will snag or catch. The horse hair is attached to the music wire as single, unlooped and unbraided strands. The threading wrapping used to connect the attractor to the music wire is so tight that the claws and teeth also do not tend to snap or catch therein. Therefore, the cat's play with the toy is fast-paced and uninterrupted by time to un-snag the claws. This typically translates to less time for the cat to "figure out" that the item is an inanimate object and less opportunities for play to slow and become boring to the cat.

Although this invention has been described above with reference to particular means, materials and embodiments, it is to be understood that the invention is not limited to these disclosed particulars, but extends instead to all equivalents within the scope of the following claims.

We claim:

1. A stringed cat toy for exercising cats and stimulating interaction between cat owners and their pets comprising:
    a music string to opposing ends of which are secured a rotatable handle and an attractor object;
    wherein the music string comprises a core, a plurality of circumferential windings and an outer sheath of flat steel wire wound around the circumferential windings.

2. The cat toy of claim 1 wherein the attractor object comprises horse hair bound into a lightweight tassel.

3. The cat toy of claim 1 wherein the music string is a low tensile strength string designed for low-frequency vibration of less than 100 Hertz.

4. The cat toy of claim 1 wherein the outer sheath is textured due to seams that exist where edges of the flat steel wrappings meet.

5. The cat toy of claim 1 wherein rotation of the handle on its axis creates motions of the attractor object as a result of dynamic properties of the music string.

6. The cat toy of claim 1 wherein the music string is selected from the group consisting of a cello G string, a bass E string, bass D, a bass A, and a cello C string.

7. A stringed cat toy comprising:
    a music string of low tensile strength designed to vibrate at frequencies less than 100 Hertz, the music string having an axis and comprising a core, a plurality of secondary internal wrappings and an external sheath;
    a rotatable handle fixedly secured to a first end of said music string; and
    an attractor object fixedly secured to a second opposite end of said music string;
    wherein rotation of said handle at said first end of said string causes said music string to form multiple waveforms along its length which causes said attractor at said second end of said string to flip and rotate around the axis of the music string.

8. The cat toy of claim 7 wherein the attractor is a horse hair tassel.

9. The cat toy of claim 8 wherein the tassel is bound tightly to said second end of said string with wraps of thread without adhesive.

10. The cat toy of claim 7 wherein the handle is a cylinder and has a diameter of less than 3/4 inches.

11. The cat toy of claim 7 wherein the music string comprises a solid core, a plurality of copper windings and a sheath of flat steel wire wherein the surface of the sheath is textured due to seams that exist where edges of the flat steel wrappings meet.

12. The cat toy of claim 7 wherein the music string is selected from the group consisting of a cello G string, a bass E string, bass D, a bass A, and a cello C string.

13. The cat toy of claim 7 wherein the music string is a cello C string.

14. The cat toy of claim 7 wherein said music string moves in response to the handle being rotated on its axis by forming a plurality of waveforms.

15. The cat toy of claim 14 wherein said music string forms at least three waveforms.

16. A stringed cat toy for exercising cats and stimulating interaction between cat owners and their pets comprising:
  a music string comprising a core, a plurality of circumferential windings and an outer sheath of flat steel wire wound around the circumferential windings, the music string having a proximal end and a distal end; and
  an attractor object attached to the distal end comprising a tassel of horse hair.

17. The cat toy of claim 16, wherein said horse hair is unbleached horse hair.

18. The cat toy of claim 16, wherein said horse hair is unbleached and uncolored stringed musical instrument bow hair.

* * * * *